United States Patent

[11] 3,532,116

| [72] | Inventors | Daniel G. Scott<br>Apollo;<br>Allan M. Huie, Monroeville, Pennsylvania |
|---|---|---|
| [21] | Appl. No. | 756,936 |
| [22] | Filed | Sept. 3, 1968 |
| [45] | Patented | Oct. 6, 1970 |
| [73] | Assignee | Westinghouse Air Brake Company<br>Wilmerding, Pennsylvania<br>a corporation of Pennsylvania |

[54] BRAKE CYLINDER PRESSURE RETAINING VALVE
5 Claims, 9 Drawing Figs.

[52] U.S. Cl. ................................................... 137/550,
303/75, 303/79, 251/309, 137/625.24
[51] Int. Cl. ..............................................F16k 11/02,
F16k 5/02
[50] Field of Search........................................ 303/75 – 79;
251/309—11; 137/550, 377, 381—384,
596.12, .2, 625.21—.24

[56] References Cited
UNITED STATES PATENTS
| 1,026,311 | 5/1912 | Hammond | 303/79 |
| 2,204,796 | 6/1940 | Farmer | 303/79 |
| 3,392,748 | 7/1968 | Geyer | 137/382 |

*Primary Examiner* — Henry T. Klinksiek
*Attorneys* — Adelbert A. Steinmiller and Ralph W. McIntire, Jr.

ABSTRACT: A three-position sealed key-type brake cylinder pressure retaining valve device, for connection to the exhaust passageway of a railway car brake control valve device, having a body provided with a securing flange and a tapered bore perpendicular to this flange in which bore a correspondingly tapered plug valve element is rotatable by a handle movable in a plane parallel to the flange selectively to any one of its three positions. The plug valve element has a stepped longitudinal bore extending inwardly from the larger end thereof, in which bore is a replaceable check valve unit. A compression spring interposed between the plug valve element and a removable screw-plug within the body biases the plug valve element into tight seating contact with the tapered bore in the body. The plug valve element has a plurality of angularly spaced orifices opening at the exterior surface of the plug valve element from the longitudinal bore, which orifices in cooperation with the check valve unit, are effective in three respective positions to selectively provide a fast blow-down of brake cylinder pressure to atmosphere, a slow blow-down to a chosen pressure above atmospheric pressure, and a slow blow-down to atmosphere.

Patented Oct. 6, 1970

INVENTOR.
DANIEL G. SCOTT
ALLAN M. HUIE
BY
*A.A. Steinmiller*
ATTORNEY

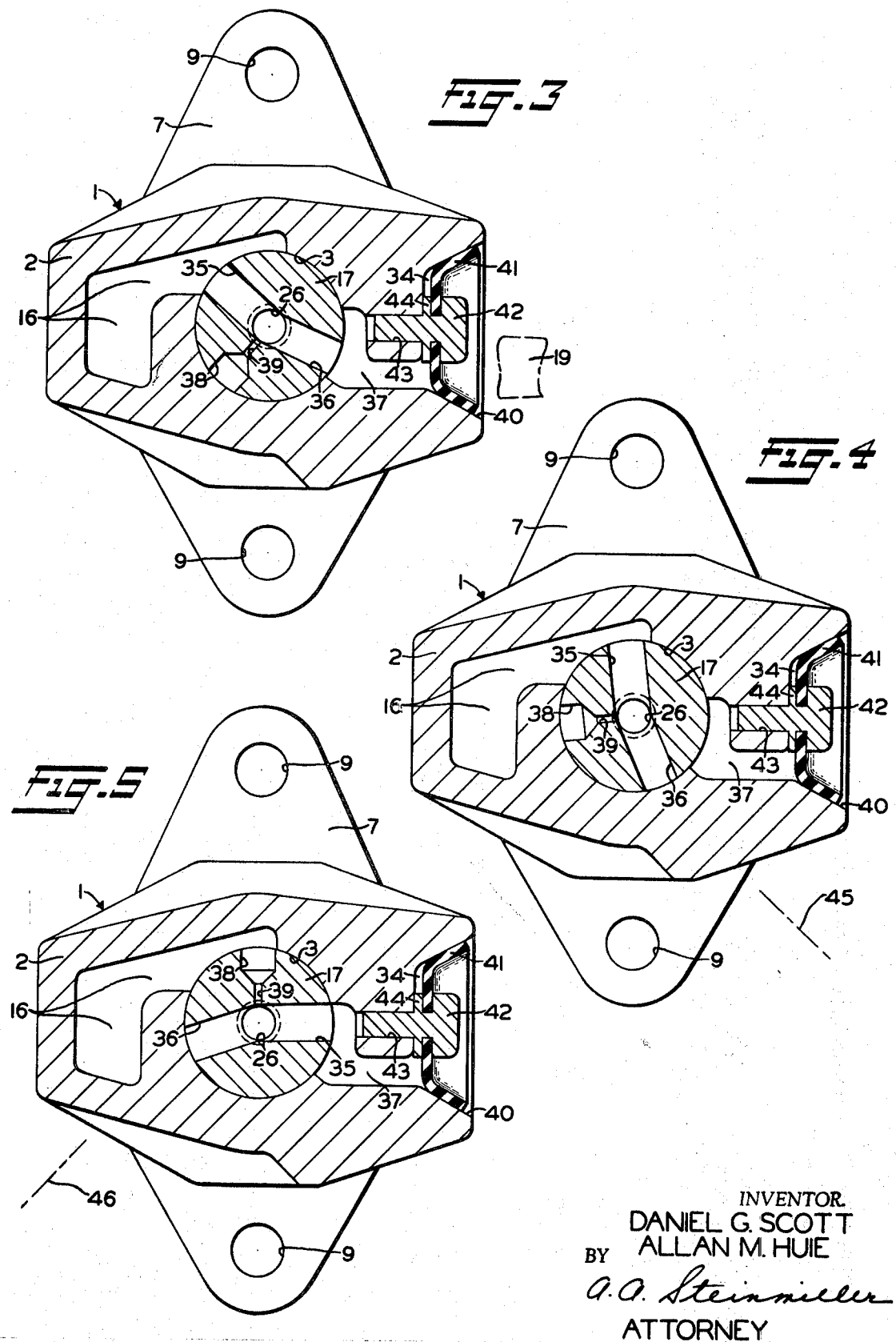

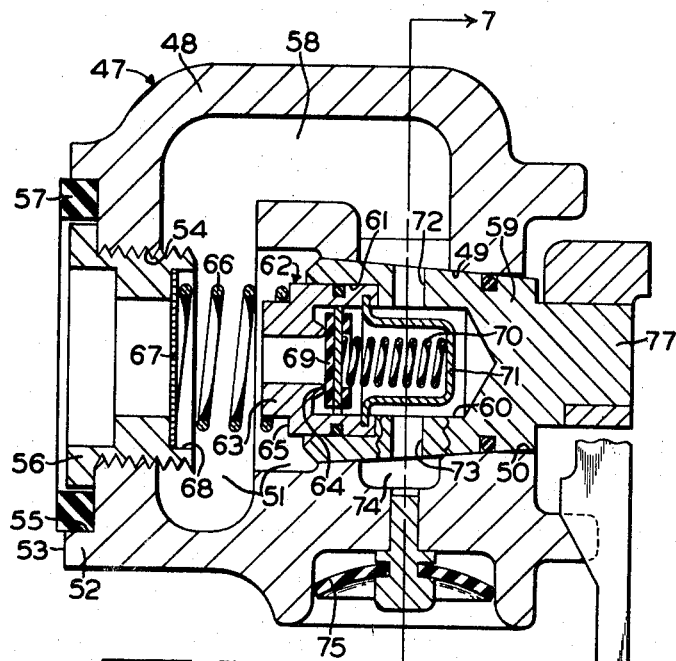
Fig. 6
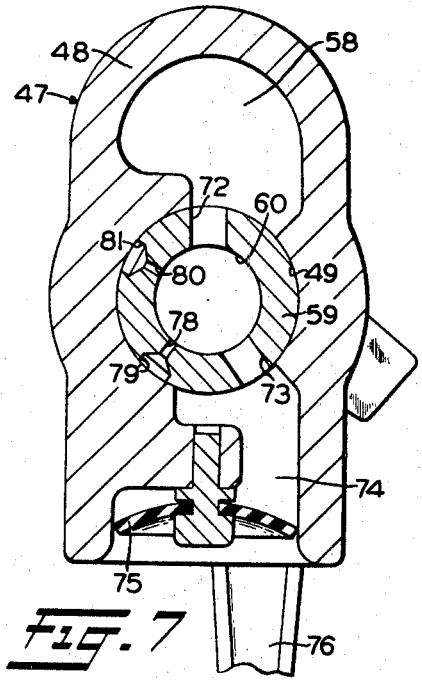
Fig. 7
Fig. 8
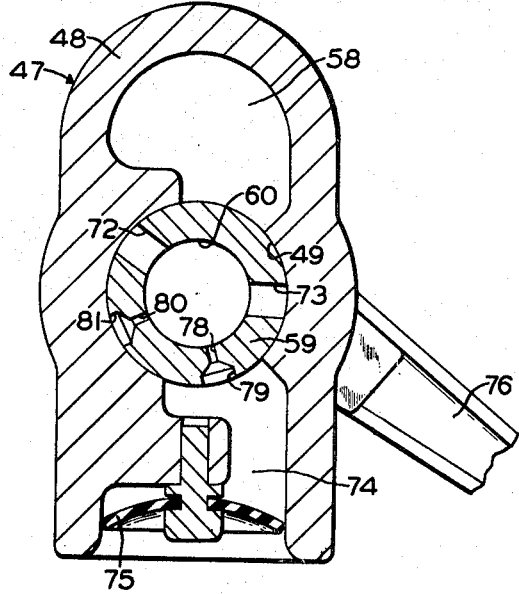
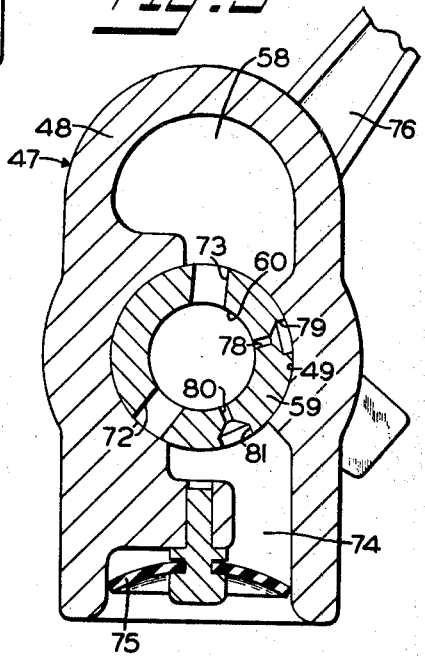
Fig. 9
INVENTOR.
DANIEL G. SCOTT
ALLAN M. HUIE
BY
ATTORNEY 3,532,116

BRAKE CYLINDER PRESSURE RETAINING VALVE

BACKGROUND OF THE INVENTION

In the copending application of Francis R. Racki, Ser. No. 756,937, filed Sept. 3, 1968, there is shown and described a brake cylinder pressure retaining valve device having a rotatable plug valve element with a check valve carried interiorly thereof, the valve element being biased to seated relation by a compression spring interposed between the valve element and a screw plug closing the opening in the valve body via which the plug valve element is inserted. Such arrangement is not tamper-proof by reason of open access to the screw plug.

Accordingly, it is the general purpose of this invention to provide an improved, novel, compact tamper-proof three-position brake cylinder pressure retaining valve device that is inexpensive from both an initial and maintenance cost standpoint.

SUMMARY OF THE INVENTION

According to the present invention, a novel tamper-proof three-position brake cylinder pressure retaining valve device is provided comprising a valve body that has a tapered bore in which a removable correspondingly tapered sealed plug valve or key is rotatable by a handle secured to the smaller end of the key and movable arcuately in a plane parallel to the face of the mounting flange. The key has a longitudinal stepped bore in the larger end in which a check valve unit is mounted. A compression spring interposed between the plug valve and a screw plug closing an opening in the body through which the plug valve is inserted into the tapered bore biases the plug valve into seated relation with the tapered bore. The plug valve has a plurality of angularly-spaced orifices opening exteriorly from the stepped bore. In three different positions of the plug valve communication is variously provided between an inlet port in the mounting flange and an outlet port so as to selectively provide a fast blow-down of brake cylinder pressure to atmospheric pressure, a slow blow-down of brake cylinder pressure past the check valve to a chosen pressure above atmospheric pressure corresponding to the loading bias on the check valve, and a slow direct blow-down of brake cylinder pressure to atmospheric pressure. Several embodiments are illustratively shown and described, in one of which the compression spring serves the additional purpose of anchoring a strainer in the screw plug. In all embodiments, the screw plug is located within the valve body so as to render it inaccessible from the exterior, once the valve body is installed in position by the mounting flange, thereby effectively making the valve device tamper-proof.

In the accompanying drawings:

FIG. 3 is a cross-sectional view, taken along the line 3-3 of FIG. 2 and looking in the direction of the arrows, showing further structural details and with the key occupying its first position in which an unrestricted and direct atmospheric venting communication is established;

FIG. 4 is a cross-sectional view of the brake cylinder pressure retaining valve device of FIG. 3 with the key shown in the second of its three positions in which a chosen pressure is retained;

FIG. 5 is a cross-sectional view of the brake cylinder pressure retaining valve device of FIG. 3 with the key shown in the third of its three positions in which a restricted atmospheric venting communication is established;

FIG. 6 is a vertical cross-sectional view of a three-position brake cylinder pressure retaining valve device constructed in accordance with a second embodiment of the invention;

FIG. 7 is a cross-sectional view, taken along the line 7-7 of FIG. 6 and looking in the direction of the arrows, showing further structural details, with the key occupying its first position in which an unrestricted and direct atmospheric venting communication is established;

FIG. 8 is a cross-sectional view of the brake cylinder pressure retaining valve device of FIG. 7 with the key shown in the second of its three positions in which a chosen pressure is retained; and FIG. 9 is a cross-sectional view of the brake cylinder pressure retaining valve device of FIG. 7 with key shown in the third of its three positions in which a restricted atmospheric venting communication is established.

Figure 1:
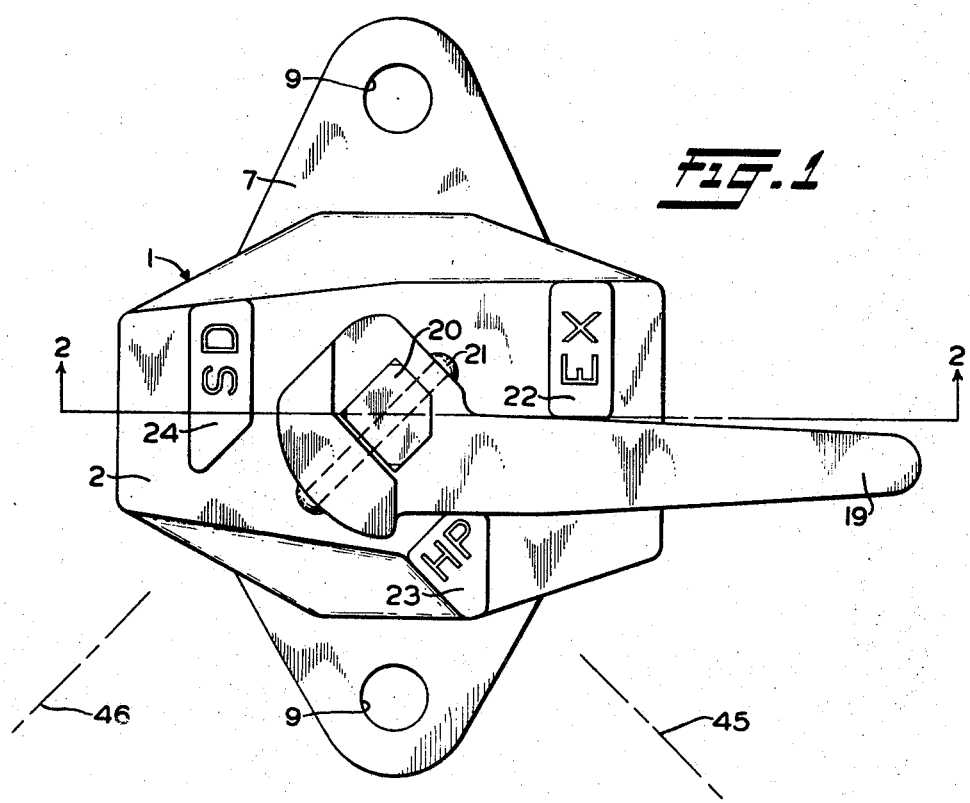
FIG. 1 is a front elevational view showing a three-position brake cylinder pressure retaining valve device constructed in accordance with one embodiment of the invention.
Figure 2:
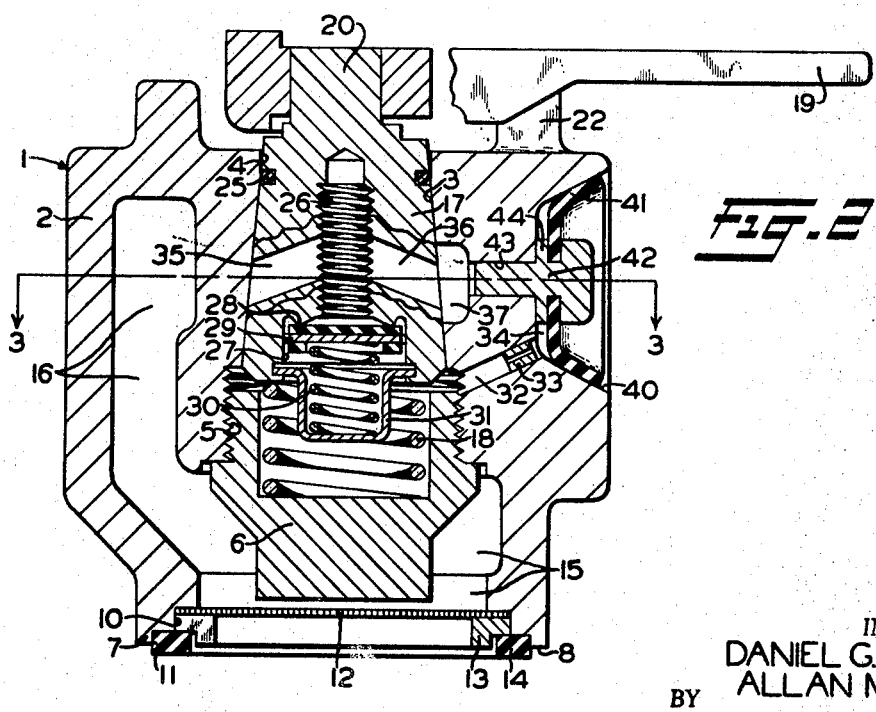
FIG. 2 is a cross-sectional view, taken along the line 2-2 of FIG. 1 and looking in the direction of the arrows, showing certain structural details of this valve device.

As shown in FIGS. 1 to 5 inclusive, a three-position brake cylinder pressure retaining valve device 1 constituting a first embodiment of the invention comprises a casing 2 having therein a tapered bore 3 which, as shown in FIG. 2, opens at its upper end into a straight smooth bore 4 and at its lower end into a screw-threaded bore 5 in which is received a screw-threaded plug 6.

As is apparent from FIGS. 1 to 5 inclusive, formed integral with the body 2 is a flange 7 having a flanged fitting face 8 (FIG. 2) that abuts a corresponding face formed on a pipe bracket (not shown) that is secured to the body of a railway car by any suitable means. This pipe bracket has connected thereto one end of a brake cylinder exhaust pipe (not shown) that has its opposite end connected to the exhaust port of the usual fluid pressure operated brake control valve device (not shown) which is provided on each car in a train. As shown in FIGS. 1, 3, 4 and 5, the flange 7 is provided with two spaced-apart smooth bores 9 for receiving cap screws (not shown) to secure the flange 7 to the pipe bracket.

The above-mentioned one end of the brake cylinder exhaust pipe is disposed in a bore (not shown) in the pipe bracket which bore is coaxial with two coaxial counterbores 10 and 11 (FIG. 2) of unequal diameter formed in the flange 7 integral with the casing 2. Disposed in the counterbore 10 is a strainer 12 that comprises a disc of wire or screening which is retained against a shoulder formed by the upper end of this counterbore 10 by a slotted annular key retainer valve guide 13 that is also disposed in this counterbore. This key retainer valve guide 13 in turn is retained in the counterbore 10 by a resilient gasket ring 14 that is disposed in the counterbore 11 and forms a seal between the flange fitting face 8 on the flange 7 and the abutting corresponding face formed on the pipe bracket when the retaining valve device 1 is secured to this pipe bracket by the above-mentioned cap screws that secured this valve device 1 to the pipe bracket.

As is apparent from FIG. 2 of the drawings, the head or lower end of the plug 6 is disposed in a chamber 15 formed in the casing 2 and connected to the tapered bore 3 in this casing by a passageway 16 also formed in the casing 2 as shown in FIGS. 2 to 5, inclusive.

As shown in FIG. 2, a tapered plug or key 17 is rotatably mounted in the tapered bore 3 in the casing 2. A spring 18 is interposed between the plug 6 and the lower end of the key 17 to bias this key 17 against the wall of the tapered bore 3 to provide sufficient friction therebetween to insure that the key 17 is not moved by car vibration from any one of three positions to which it may be manually moved by a handle 19 shown in a broken away position in FIG. 2. This handle 19, as shown in FIG. 1, has a substantially square socket into which fits a substantially square shank 20 (FIGS. 1 and 2) formed on the upper end of the key 17 and is secured to this shank by a rivet 21.

As shown in FIG. 1 of the drawings, cast or stenciled on three arcuately spaced-apart lugs 22, 23 and 24 integral with the casing 2 are the indicia EX, HP and SD denoting exhaust, high pressure and slow direct positions of the key 17 accordingly as the handle 19 respectively abuts the lower side of lug 22, as shown in FIG. 1, overlies the lug 23, or abuts the lower inclined end of the lug 24, the lugs 22 and 24 serving as limit stops for the handle 19 in that they extend from the top of casing 2 a distance greater than the plane of rotation of the handle 19 from the top of this casing.

As shown in FIG. 2, the tapered key 17 is provided adjacent the shank 20 with a peripheral annular groove in which is disposed an O-ring 25 that forms a seal with the wall surface of the straight bore 4 to prevent leakage of fluid under pressure from the passageway 16 to atmosphere along the periphery of the key 17.

This key 17, as also shown in FIG. 2, is provided with a screw-threaded bottomed bore 26 the screw threads being provided to facilitate machining during manufacture of this key and are not necessary to the proper operation of the retaining valve device 1. The lower end of this bottom bore 26 opens into a coaxial counterbore 27 and has formed on this lower end an annular valve seat 28 against which a flat disc-type check valve 29 is biased by a spring 30 interposed between this check valve 29 and a slotted cup-shaped spring seat 31 that has at its upper end an outturned flange which is inserted in a groove formed in the wall surface of the counterbore 27.

While the spring 30 biases the valve 29 against its seat 28 communication is closed between the bottomed bore 26 and a drilled passageway 32 provided in the body 2 and having disposed therein a choke 33. One end of this passageway 32 opens into the screw-threaded bore 5 and the opposite end of this passageway 32 opens into a chamber 34 formed in the casing 2.

The key 17 is further provided with a pair of bores or ports 35 and 36 of large diameter, the axes of these bores being at an angle to the axis of the above-mentioned screw-threaded bottomed bore 26 whereby fluid under pressure may flow from the chamber 15 to the chamber 34 and thence to atmosphere via passageway 16 and bores 35, 26 and 36, and an outlet passageway 37 formed in the casing 2 and opening at one end at the wall surface of the bore 3 and at the opposite end into the chamber 34 to provide, while the handle 19 and key 17 are in their exhaust position shown in FIG. 3, for a fast and complete blow-down of fluid under pressure from a brake cylinder device to atmosphere, it being understood that bores 35 and 36 are shown in a broken away position in FIG. 2.

A slow blow-down of brake cylinder pressure to a chosen pressure above atmospheric pressure, is provided when the key 17 is rotated to the position shown in FIG. 4 since in this position fluid under pressure may flow from chamber 15 to the chamber 34 and thence to atmosphere via passageway 16, bores 35 and 26, past unseated check valve 29 (FIG. 2) which is unseated from its seat 28 against the yielding resistance of spring 30 by fluid under pressure acting on the upper side of this valve 29, counterbore 27, bore 5, passageway 32 and choke 33.

In order to provide for a slow direct complete blow-down of fluid under pressure from the brake cylinder device, while the handle 19 is in its slow direct position in which the key 17 occupies the position shown in FIG. 5, this key 17 is provided with a counterbore 38 that has one end opening at the peripheral surface of the key and into the passageway 16. The opposite end of counterbore 38 registers with one end of a coaxial bore 39 of small diameter that at its opposite end opens into the bottomed bore 26 the bore 39 thus constituting a choke between the counterbore 38 and the bore 26.

As best shown in FIGS. 2 to 5 inclusively of the drawings, the casing 2 has formed on its right-hand side a conical inner surface 40. Resting against this conical inner surface 40 is an annular dished circular shield 41 which is preferably formed of a resilient material such as rubber. This shield 41 is held in place by suitable means such as, for example, a headed pin 42 which is press-fitted into a bore 43 provided in the casing 2 and opening into the passageway 37. The pin 42 is provided with a collar 44 that is spaced away from the head of this pin a distance substantially equal to the thickness of the annular rubber shield 42 which is stretched or slipped over the head so as to be disposed between the collar 44 and the head. Upon press-fitting the pin 42 into the bore 43, the circumferential surface of the shield 41 is adapted to abut the conical surface 40 for preventing access to the chamber 34 of particles of foreign matter or by nest building insects such as, for example, mud wasps. It will be noted that the surface 40 extends somewhat beyond the rubber shield 41 so as to provide an adequate protection against the formation of ice over the opening into the frusto-conical cavity in which the shield is disposed, and that the shield has sufficient area and flexibility to insure its displacement under the pressure of fluid released from the brake cylinder device to eject any foreign matter that might reach it.

It will be understood that the usual brake control valve device provided on railway cars is operative in the usual manner in effecting a brake release to vent fluid under pressure from the brake cylinder device on the corresponding car by way of the brake cylinder exhaust pipe that has one end connected to the pipe bracket to which the brake cylinder pressure retaining valve device 1 is secured by cap screws extending through the bores 9 in the flange 7.

Fluid under pressure thus vented from the brake cylinder device flows via a brake cylinder pipe (not shown) connecting the brake cylinder device to the corresponding brake control valve device, this brake control valve device, which it may be assumed is in its release position, the brake cylinder exhaust pipe, the pipe bracket, annular gasket ring 14 (FIG. 2), key retainer valve guide 13 and strainer device 12 to the chamber 15. Assuming that the handle 19 of the brake cylinder pressure retaining valve device 1 is disposed in its first or direct exhaust position shown in FIGS. 1 and 3, it will be understood that the key 17 occupies the position shown in FIG. 3. In this position of the key 17 the flow of fluid under pressure from the brake cylinder device is unrestricted from the chamber 15 to atmosphere via passageway 16, bores 35, 26 and 36, passageway 37, chamber 34 and thence past the rubber shield 41 which is deflected away from the conical surface 40 whenever the pressure in the chamber 34 exceeds atmospheric pressure. It will be apparent that, when fluid under pressure thus discharged from the brake cylinder device and chamber 15 is reduced to substantially atmospheric pressure, the shield 41 will return to the position shown in FIGS. 2 to 5 inclusive in which its outer peripheral portion lies in contact with the conical inner surface 40 on the casing 2.

From the foregoing it is apparent that, when a brake release is effected while the handle 19 occupies the direct exhaust position shown in FIGS. 1 and 3, no fluid under pressure is retained in the brake cylinder device.

If it is desired to release fluid under pressure from the brake cylinder device at a chosen slow rate until the pressure therein is reduced to a chosen pressure such as, for example, 20 pounds per square inch, and thereafter retain this pressure in the brake cylinder device when a brake release and recharge of the brake equipment is effected while a train is descending a long grade, prior to beginning the descent, the train will be stopped and a trainman, assuming each car in the train to be provided with the brake cylinder pressure retaining valve device 1 shown in FIGS. 1 to 5 inclusive, will manually rotate the handle 19 of each valve device 1 clockwise from its first position shown in FIG. 1 to a second position in which the handle 19 is in alignment with and overlies the indicium HP on the casing 2, this second or high pressure position of the handle 19 being shown in broken lines in FIGS. 1 and 4 and denoted by the numeral 45.

As the handle 19 is rotated as described above, it is effective to rotate the key 17 therewith from its first position shown in FIG. 3 to its second position shown in FIG. 4 in which one end of the bore 35 opens into the passageway 16. Now when the brake control valve device is moved to its release position in response to an increase in pressure in the usual train brake pipe, fluid under pressure will flow from the brake cylinder device to the chamber 15 and passageway 16 (FIG. 4) in the manner hereinbefore described. Since the key 17 now occupies the position shown in FIG. 4, the fluid under pressure supplied to the passageway 16 flows to the upper side of the check valve 29 (FIG. 2) via the bore 35 and the bottomed bore 26 and acts on the area of this valve within the annular valve seat 28 it being noted that the outer end of the bore 36 (FIG. 4) is closed by the casing 2. When the pressure acting on the area of the valve 29 (FIG. 2) within the annular valve seat 28 formed on the key 17 has been increased to a chosen pressure such as, for example, 20 pounds per square inch, valve 29 will be moved downward, as viewed in FIG. 2, away from the valve seat 28 against the yielding resistance of the spring 30.

Subsequent to the unseating of the valve 29 in the manner just explained, fluid under pressure supplied from the brake cylinder device to the interior of the bottom bore 26 will flow past the unseated valve 29 and thence to atmosphere via counterbore 27 (FIG. 2), bore 5, passageway 32, choke 33, chamber 34 and past the rubber shield 41 at a slow or restricted rate determined by the size of the choke 33 until the pressure in the brake cylinder device is reduced to the aforementioned 20 pounds per square inch at which time the spring 30 will move the valve 29 into seating contact with its seat 28 to prevent a further reduction in pressure in the brake cylinder device. Thus, a pressure of, for example, 20 pounds per square inch, is retained in each brake cylinder device to maintain the brakes applied while the brake equipment is released and recharged preparatory to effecting a second or successive brake application as a train descends a long grade in mountainous terrain.

If it is desired to provide a complete release of fluid under pressure from the brake cylinder devices on the cars in a train, but at a slow or restricted rate, when a brake release and recharge of the brake equipment is effected while a train is descending a long grade, prior to beginning the descent, the train will be stopped and a trainman will manually rotate the handle 19 clockwise (FIG. 1) from the position it occupies until the handle abuts the lug 24 bearing the indicium SD, this third position of the handle 19 being shown in broken lines in FIGS. 1 and 5 and indicated by the reference numeral 46.

As the handle 19 is rotated as described above, it is effective to rotate the key 17 therewith to its third position shown in FIG. 5 in which one end of the counterbore 38 is open to the passageway 16 and the end of the bore 35 opening at the peripheral surface of the key 17 is in alignment with the passageway 37.

It is apparent that when the brake control valve device is moved to its release position in response to an increase in pressure in the train brake pipe, fluid under pressure will flow from the brake cylinder device to the chamber 15 and passageway 16 (FIG. 5) in the manner hereinbefore described. With the key 17 now occupying the position shown in FIG. 5, the fluid under pressure supplied to the passageway 16 will flow to atmosphere via counterbore 38, bore 39 which constitutes a choke, bores 26 and 35, passageway 37, chamber 34 and past the rubber shield 41 at a slow or restricted rate determined by the size of the bore or choke 39 until fluid under pressure has been completely depleted from the respective brake cylinder device or in other words until the pressure in each brake cylinder device has been reduced to atmospheric pressure.

FIGS. 6 to 9 inclusive show a three-position brake cylinder pressure retaining valve device 47 that constitutes a second embodiment of the invention.

According to the second embodiment of the invention shown in FIGS. 6 to 9 inclusive, this three-position brake cylinder pressure retaining valve device 47 comprises a casing 48 which may be, for example, cast iron, provided with a tapered bore 49 which, as shown in FIG. 6, opens at its right-hand end into a straight smooth bore 50 and at its left-hand end into a chamber 51 formed in the casing 48.

As is apparent from FIG. 6, formed integral with the casing 48 is a flange 52 which is identical in construction to the flange 7 shown in FIGS. 1 to 5 inclusive. This flange 52 has a flanged fitting face 53 which corresponds to the flanged fitting face 8 of the first embodiment of the invention and which serves the same purpose. Extending from the flanged fitting face 53 through the flange 52 and the casing 2 to the chamber 51 is a screw-threaded bore 54 that is coaxial with a counterbore 55 provided in the flange 52 and opening at the flanged fitting face 53. An annular screw-threaded plug 56 has screw-threaded engagement with the screw-threaded bore 54 and a resilient gasket ring 57 is disposed in the counterbore 55.

The casing 48 is provided with a passageway 58 which, as shown in FIG. 6, opens at one end into the chamber 51 and at the opposite end at the wall surface of the tapered bore 49.

As shown in FIGS. 6 to 9 inclusive, a tapered plug 59 constructed of, for example, brass, is rotatably mounted in the corresponding tapered bore 49 in the casing 48. This plug 59 is provided with a bottom bore 60 and a coaxial counterbore 61 in which is disposed a replaceable check valve unit 62 which will now be described.

The check valve unit 62 comprises an annular cup-shaped member 63 which is disposed in the counterbore 61 and is provided with an annular valve seat 64 and a shoulder 65. The cup-shaped member 63 is constantly biased against the right-hand end of the counterbore 61 by a spring 66 which is interposed between the shoulder 65 on member 63 and a strainer 67 that, like the strainer 12 in the first embodiment of the invention, comprises a disc of wire or screening, is disposed in a counterbore 68 provided in the right-hand end of the plug 56. The check valve unit 62 further comprises a flat disc-type check valve 69 which is normally biased against the annular valve seat 64 by a spring 70 interposed between this check valve and a slotted cup-shaped spring seat 71 that has at its left-hand end an out turned flange which is inserted in a groove formed in the wall surface of the cupped portion of the member 63.

While spring 70 biases the valve 69 against its seat 64, and the key 59 occupies its second position shown in FIG. 8, communication is closed between the interior of the bottom bore 60 and the chamber 51.

The key 59 is further provided with a pair of bores 72 and 73, of large diameter that at one end open into the bottom bore 60 whereby fluid under pressure may flow from the chamber 51 to atmosphere at an unrestricted rate, while the key 59 occupies its exhaust position shown in FIG. 7, via passageway 58, bores 72, 60 and 73, an outlet passageway 74 formed in the casing 48, and past a rubber shield 75 which normally closes the outlet passageway 74 and is similar in construction to the shield 41 in the first embodiment of the invention, to provide a fast and complete blow-down of fluid under pressure from a brake cylinder device.

A slow blow-down of brake cylinder pressure to a chosen pressure above atmospheric pressure is provided when the key 59 is rotated to a high pressure position shown in FIG. 8 by a handle 76 having a substantially square socket into which fits a substantially square shank 77 (FIG. 6) formed on the right-hand end of the key 59. The handle 76 is secured to the shank 77 by a rivet (not shown) as in the first embodiment of the invention. While the key 59 occupies its high pressure position shown in FIG. 8, fluid under pressure flows from the chamber 51 to the left-hand side of the check valve 69 via the annular cup-shaped member 63 to unseat this valve 69 from its seat 64 against the yielding resistance of the spring 70. With the valve 69 thus unseated, fluid under pressure flows from the chamber 51 to atmosphere via the annular cup-shaped member 63, past unseated check valve 69, bottom bore 60, a bore 78 of small diameter in the key 59 which bore constitutes a choke, a coaxial counterbore 79, outlet passageway 74 and past the shield 75.

In order to provide for a slow direct complete blow-down of fluid under pressure from the brake cylinder device, upon manually rotating the key 59 by means of the handle 76 to its slow direct position in which it is shown in FIG. 9, the key 59 is provided with a second bore 80 and a coaxial counterbore 81 the outer end of which opens at the peripheral surface of the key and into the outlet passageway 74.

When a brake release is made, the usual brake control valve device provided on railway cars is operative in the manner described in connection with the first embodiment of the invention to vent fluid under pressure from the corresponding brake cylinder device to the chamber 51. Assuming that the handle 76 of the brake cylinder pressure retaining valve device 47 is disposed in its first or direct exhaust position shown in FIGS. 6 and 7, it will be understood that the key 59 occupies the position shown in FIG. 7. In this position of the key 59, the flow of fluid under pressure from the brake cylinder device is unrestricted from the chamber 51 to atmosphere via passageway 58, bores 72, 60 and 73, outlet passageway 74 and thence past the rubber shield 75 which is deflected away from the casing 48 whenever the pressure in the passageway 74 exceeds atmospheric pressure. It will be apparent that whenever fluid under pressure thus discharged from the brake cylinder device and chamber 51 is reduced to substantially atmospheric pressure, the shield 75 will return to the position shown in FIGS. 6 to 9, inclusive.

It is apparent from the foregoing that, when a brake release is effected while the handle 76 occupies its direct exhaust position shown in FIGS. 6 and 7, no fluid under pressure is retained in the brake cylinder device.

If it is desired to release fluid under pressure from the brake cylinder device at a chosen slow rate until the pressure therein is reduced to a chosen pressure such as, for example, 20 pounds per square inch, and thereafter retain this pressure in the brake cylinder device when a brake release and recharge of the brake equipment is effected while a train is descending a long grade, prior to beginning the descent, the train will be stopped and a trainman, assuming each car in the train to be provided with the brake cylinder pressure retaining valve device 47 shown in FIGS. 6 to 9 inclusive, will manually rotate the handle 76 of each valve device 47 clockwise, as viewed from the right-hand side of FIG. 6, from its first position shown in FIG. 7 to a second position in which the handle 76 is in alignment with and overlies an indicium HP (not shown) on the casing 48.

As the handle 76 is rotated as described above, it is effective to rotate the key 59 therewith from its first position shown in FIG. 7 to its second position shown in FIG. 8 in which one end of the counterbore 79 opens into the outlet passageway 74. Now when the brake control valve device is moved to its release position in response to an increase in pressure in the usual train brake pipe, fluid under pressure will flow from the brake cylinder device to the chamber 51 (FIG. 6) in the manner hereinbefore described. Since the key 59 now occupies the position shown in FIG. 8, the fluid under pressure supplied to the chamber 51 flows to the left-hand side of the check valve 69 (FIG. 6) via the annular cup-shaped member 63 and acts on the area of this valve within the annular valve seat 64 it being noted that the outer end of the bores 72 and 73 (FIG. 8) are closed by the casing 48. When the pressure acting on the area of the valve 69 (FIG. 6) within the annular valve seat 64 formed on the member 63 has been increased to a chosen pressure such as, for example, 20 pounds per square inch, valve 69 will be moved in the direction of the right hand, as viewed in FIG. 2 away from the valve seat 64 against the yielding resistance of the spring 70.

Subsequent to the unseating of the valve 69 in the manner just explained, fluid under pressure supplied from the brake cylinder device to the interior of the annular member 63 will flow past the unseated valve 69 and thence to atmosphere via bottom bore 60 (FIG. 6), choke 78 (FIG. 8), counterbore 79, passageway 74 and past the rubber shield 75 at a slow or restricted rate determined by the size of the choke 78 until the pressure in the brake cylinder device is reduced to the aforementioned 20 pounds per square inch at which time the spring 70 will move the valve 69 into seating contact with its seat 64 to prevent a further reduction in pressure in the brake cylinder device. Thus, a pressure of, for example, 20 pounds per square inch, is retained in each brake cylinder device to maintain the brakes applied while the brake equipment is released and recharged preparatory to effecting a second or successive brake application as a train descends a long grade in mountainous terrain.

If it is desired to provide a complete release of fluid under pressure from the brake cylinder devices on the cars in a train, but at a slow or restricted rate, when a brake release and recharge of the brake equipment is effected while a train is descending a long grade, prior to beginning the descent, the train will be stopped and a trainman will manually rotate the handle 76 clockwise until it and the key 59 occupy the position shown in FIG. 9. While the handle 76 and key 59 occupy their third position shown in FIG. 9, one end of the counterbore 81 opens into the passageway 74 and the outer end of the bore 73 that opens at the peripheral surface of the key 59 is in alignment with the passageway 58.

It is apparent that when the brake control valve device is now moved to its release position in response to an increase in pressure in the train brake pipe, fluid under pressure will flow from the brake cylinder device to the chamber 51 and passageway 58 (FIG. 9) in the manner hereinbefore described. With the key 59 now occupying the position shown in FIG. 9, the fluid under pressure supplied to the passageway 58 will flow to atmosphere via bores 73 and 60, bore 80 which constitutes a choke, counterbore 81, outlet passageway 74 and past the rubber shield 75 at a slow or restricted rate determined by the size of the bore or choke 80 until fluid under pressure has been completely depleted from the respective brake cylinder device or in other words until the pressure in each brake cylinder device has been reduced to atmospheric pressure.

We claim:

1. A brake cylinder pressure retaining valve device comprising a casing having a mounting flange for attachment to a support member, an inlet port in said flange, and an outlet port remote from said flange, wherein the improvement comprises the arrangement of:
   a. a chamber in said casing into which said inlet port opens,
   b. a tapered bore in said casing in coaxial alignment with said inlet port and having its larger diameter end opening into said chamber,
   c. a cock key tapered conformingly to said bore and rotatable therein to different rotary positions to variously control flow of fluid under pressure between the inlet port and the outlet port,
   d. a screw plug inserted through said inlet port and secured to said casing in a position to be inaccessible from the exterior of the casing when the mounting flange is secured to a support member, and
   e. spring means interposed between said plug and the inner end of the cock key to bias the key into seated position in the tapered bore.

2. A brake cylinder pressure retaining valve device, as claimed in claim 1, further characterized in that said cock key has a coaxial bore therein opening toward said chamber and having a shoulder on which is an annular valve seat, a check valve is disposed in said coaxial bore, a spring retainer is secured to the cock key, and a spring is interposed between said retainer and said check valve for yieldingly biasing the valve to seated position on the valve seat and also in that said screw plug has a recess therein containing said spring means and into which said spring retainer extends.

3. A brake cylinder pressure retaining valve device as claimed in claim 1, further characterized in that said screw plug is annular in form and in its installed position in said casing comprises a portion having a face in coplanar concentric relation to the mounting face of the flange and providing one wall of an annular groove, and by an annular sealing means positioned in said groove, the central opening in said screw plug serving as the inlet port to said chamber.

4. A brake cylinder pressure retaining valve device as claimed in claim 2 wherein the said cock key is further characterized by a plurality of different ports therein communicating said chamber to said coaxial bore at the inner seated area of the said check valve via which in the different positions of the cock key flow of fluid under pressure from the inlet port to the outlet port is variously controlled and in one of which positions fluid under pressure communicated to the coaxial bore in the cock key must unseat the check valve before exhausting at the outlet port, thereby limiting the reduction of fluid pressure to a certain low pressure at which the check valve seats.

5. A brake cylinder pressure retaining valve device, as claimed in claim 1, wherein said cock key has a stepped bore therein coaxial to the inlet port and opening toward said chamber and further characterized by a replaceable check valve unit sealingly received in a portion of said stepped bore and comprising:

a. a sleeve having an internal bore in which an annular valve seat is formed, b. a check valve within the sleeve for seating on said seat, c. a spring retainer removably secured to one end of the sleeve, and d. a spring interposed between the retainer and the valve biasing the valve into seated relationship with said seat, said spring means being interposed between said screw plug and said sleeve to concurrently urge said check valve unit into the stepped bore of the cock key and at the same time bias the cock key into seated position in the tapered bore.